United States Patent
Choppakatla et al.

(10) Patent No.: US 8,495,581 B2
(45) Date of Patent: Jul. 23, 2013

(54) CODE EVALUATION BASED ON FAILURE PREDICTION

(75) Inventors: Satya R. P. Choppakatla, Bangalore (IN); Logeswaran T. Rajamanickam, Bangalore (IN); Arun Ramakrishnan, Chennai (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 13/101,549

(22) Filed: May 5, 2011

(65) Prior Publication Data

US 2012/0284697 A1 Nov. 8, 2012

(51) Int. Cl.
*G06F 9/44* (2006.01)
(52) U.S. Cl.
USPC .......................... 717/126; 717/130
(58) Field of Classification Search
USPC ................... 717/126–128, 130, 131
See application file for complete search history.

(56) References Cited

U.S. PATENT DOCUMENTS

| | | | |
|---|---|---|---|
| 7,240,335 B2 | 7/2007 | Angel et al. | |
| 7,584,455 B2 | 9/2009 | Ball | |
| 2005/0149881 A1* | 7/2005 | Proulx et al. | 715/853 |
| 2006/0070048 A1 | 3/2006 | Li et al. | |
| 2006/0186893 A1* | 8/2006 | Schmidt | 324/602 |
| 2007/0136683 A1* | 6/2007 | Heidari et al. | 715/792 |
| 2009/0144698 A1 | 6/2009 | Fanning et al. | |
| 2009/0265693 A1 | 10/2009 | Bakowski | |
| 2009/0328175 A1* | 12/2009 | Shuster | 726/7 |
| 2010/0262866 A1 | 10/2010 | Nir-Buchbinder et al. | |

FOREIGN PATENT DOCUMENTS

| | | |
|---|---|---|
| TW | 487878 B | 5/2002 |
| WO | 2010107671 A2 | 9/2010 |

OTHER PUBLICATIONS

"Code coverage", Wikipedia, pp. 1-7, retrieved Apr. 5, 2011 http://en.wikipedia.org/wiki/Code_coverage.
"Java Code Coverage for Eclipse", pp. 1-2, retrieved Apr. 5, 2011 http://eclemma.org/.
"Code Coverage for Java—Clover", pp. 1-2, retrieved Apr. 5, 2011 https://www.atlassian.com/software/clover/.
Harold, "Test your tests with Jester" IBM developerWorks, pp. 1-7, retrieved Apr. 8, 2011 https://www.ibm.cvom/developerworks/library/j-jester/.
"All About Code Coverage—A White Box Testing Technique",Articlesbase free online articles directory, pp. 1-5, retrieved Apr. 8, 2011 http://www.articlesbase.com/software-articles/.all-about-code-coverage-a-white-box-testing-technique/.
Kaner, "Software Negligence and Testing Coverage", 1995, pp. 1-13, STARConference, Orlando, May 16, 1996.
"Crap4j FAQ," http://www.crap4j.org/faq.html, accessed Jun. 5, 2012, 3 pages.

* cited by examiner

*Primary Examiner* — Anna Deng
(74) *Attorney, Agent, or Firm* — Yee & Associates, P.C.; Libby Z. Toub

(57) ABSTRACT

A method and apparatus for evaluating code. A likelihood that a set of segments of the code will not run as desired based on a policy is identified. A risk of the code not performing as desired is evaluated based on a result from a code coverage test and the likelihood that the set of segments of the code will not run as desired.

15 Claims, 7 Drawing Sheets

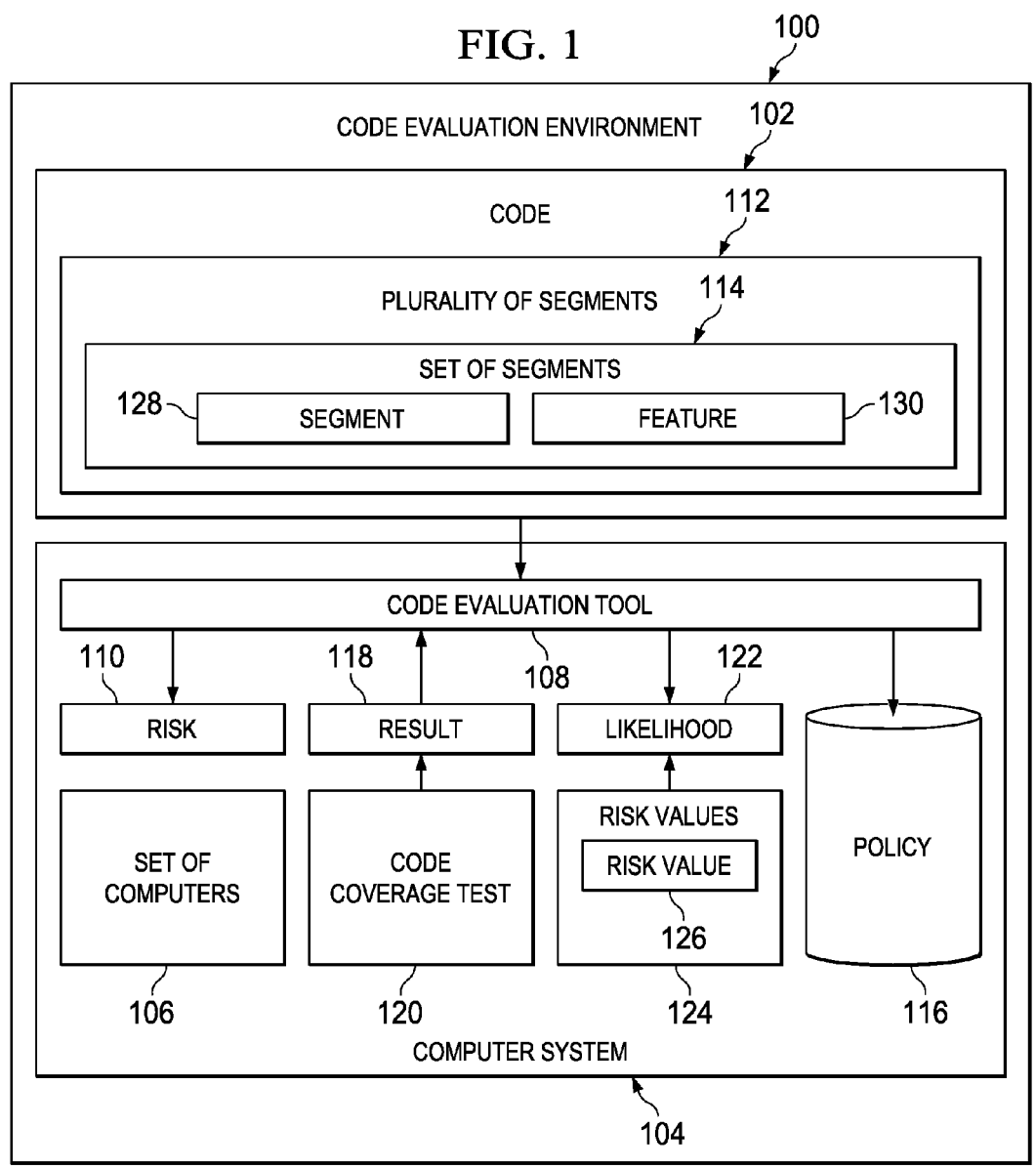

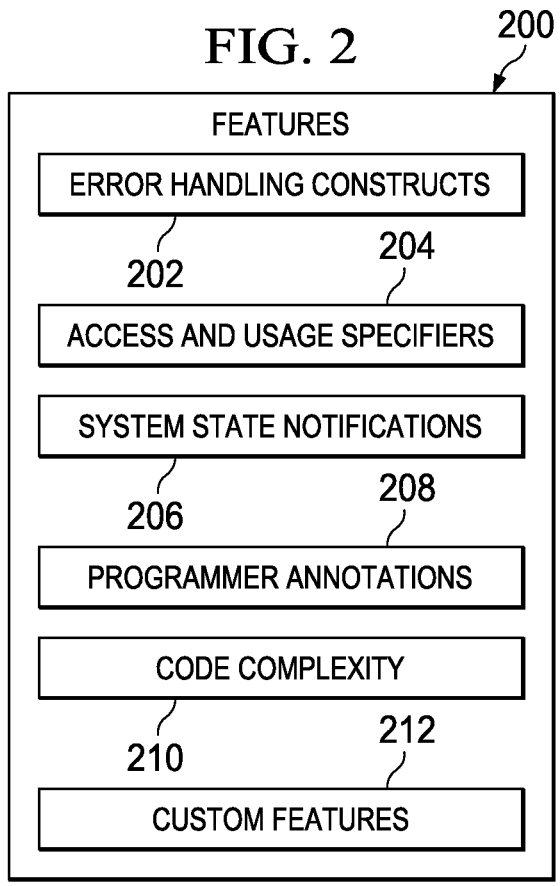

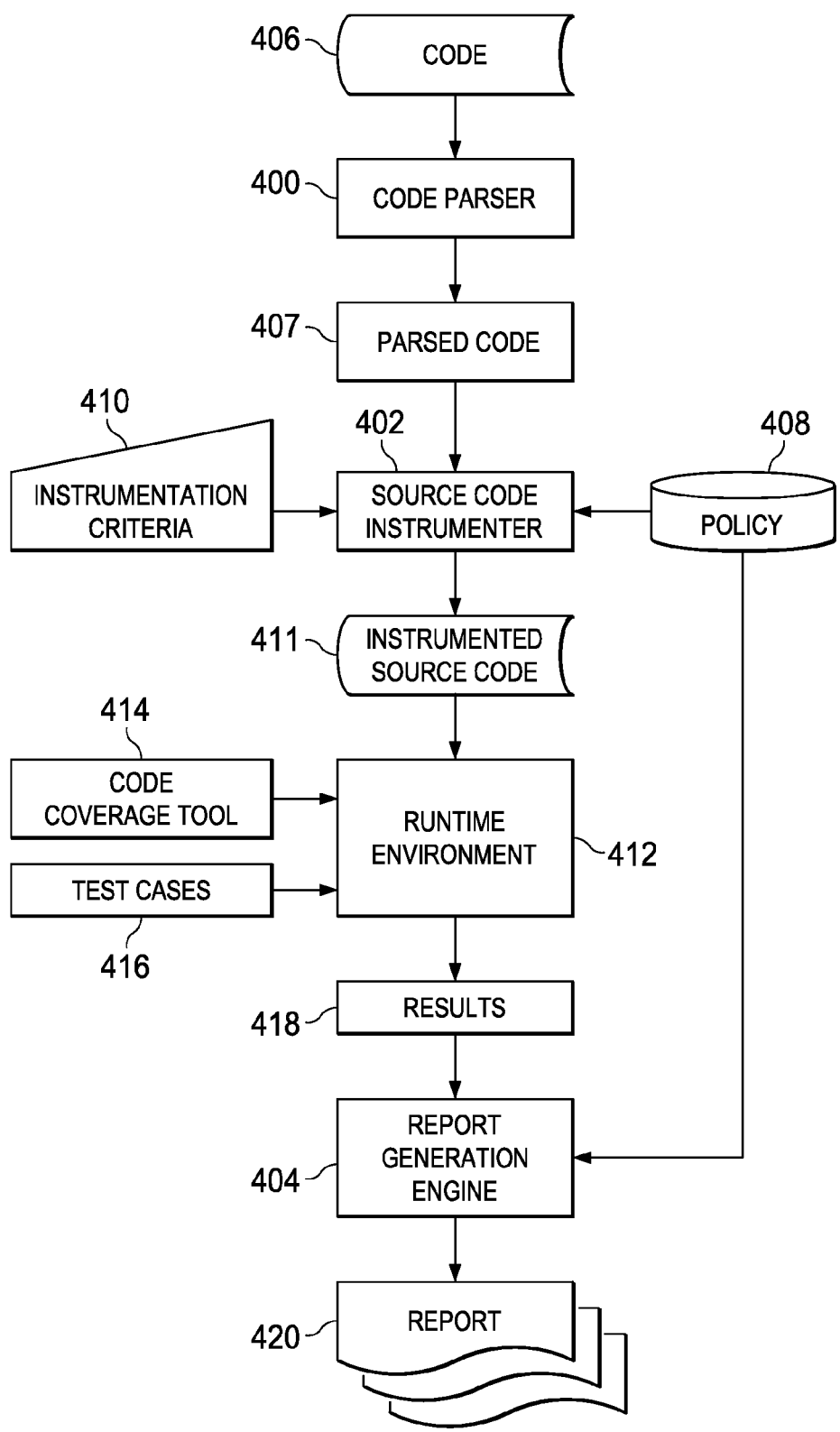

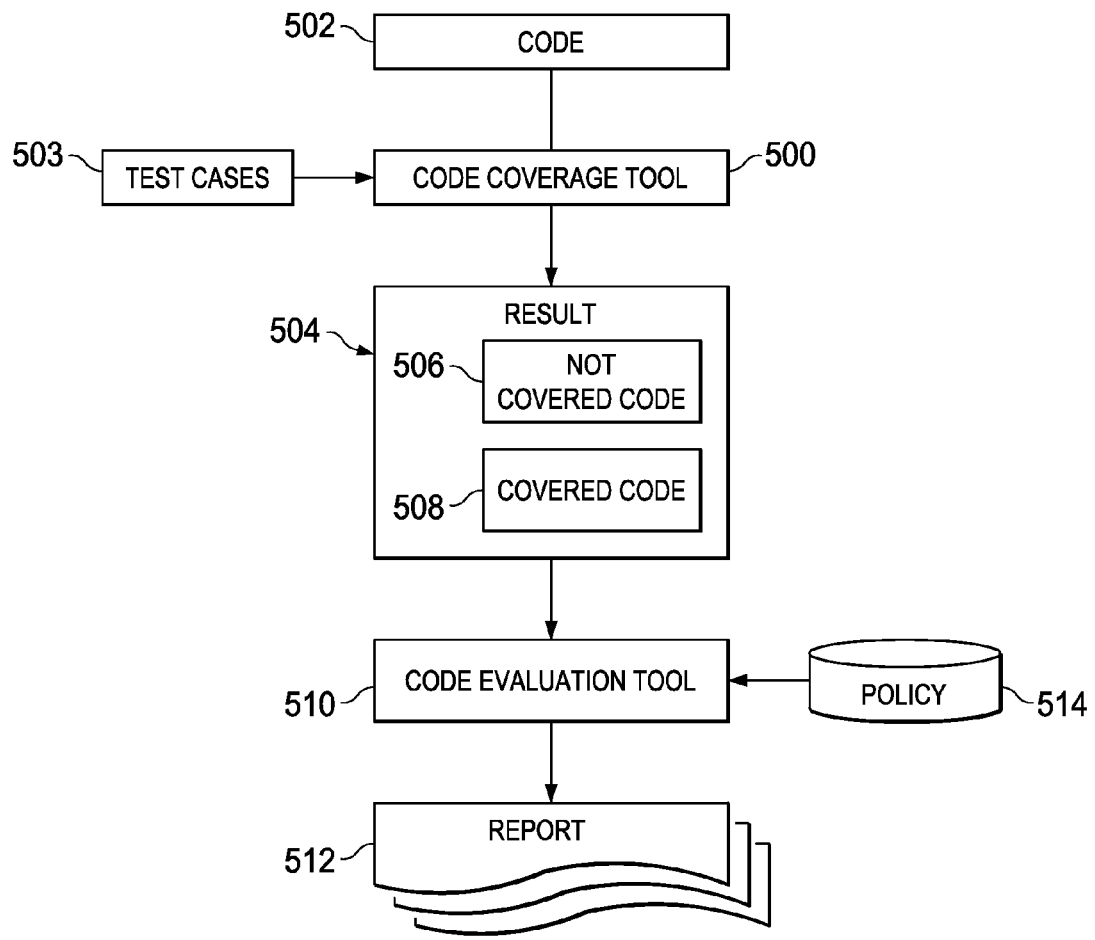

CODE EVALUATION BASED ON FAILURE PREDICTION

BACKGROUND

1. Field

The disclosure relates generally to an improved data processing system and, in particular, to processing code. Still more particularly, the present disclosure relates to a method and apparatus for evaluating code in software testing.

2. Description of the Related Art

In testing software, one test used is a code coverage test. The code coverage test generates a result that describes the degree to which the source code has been tested. With this type of testing, the application is run using a test suite. A test suite is a collection of test cases that are to be used to test a software program. Each test case is used to show that the particular application has some specified number of behaviors or results.

When running these test cases, the results are collected. The results are referred to the code as code coverage. The criteria in code coverage may include whether a function has been called, whether each node has been run, whether each branch or decision has been met or not met, whether each condition has been evaluated to both true and false, and/or other suitable types of criteria.

Typically, the code for the application is instrumented to collect data about the running of the code in response to using the test suite. It is desirable to run the application in a manner that every function, statement, and other suitable constructs in the application are run during testing. This process allows developers and programmers to look for parts of an application that are rarely or never accessed under normal operating conditions. The code coverage provides a result that may be analyzed to identify what areas of the code have not been run.

SUMMARY

In one illustrative embodiment, a method for evaluating code is provided. A likelihood that a set of segments of the code will not run as desired based on a policy is identified. A risk of the code is evaluated not performing as desired based on a result from a code coverage test and the likelihood that the set of segments of the code will not run as desired.

In another illustrative embodiment, a computer comprises a bus, a storage device, and a processor unit. The storage device is connected to the bus. Program code is stored on the storage device. The processor unit is connected to the bus. The processor unit is configured to run the program code to identify a likelihood that a set of segments of code will not run as desired based on a policy. The processor unit is further configured to evaluate a risk of the code not performing as desired based on a result from a code coverage test and the likelihood that the set of segments of the code will not run as desired.

In yet another illustrative embodiment, a computer program product comprises a computer readable storage medium, first program code, and second program code. The first program code is for identifying a likelihood that a set of segments of code will not run as desired based on a policy. The second program code is for evaluating a risk of the code not performing as desired based on a result from a code coverage test and the likelihood that the set of segments of the code will not run as desired. The first program code and the second program code are stored on the computer readable storage medium.

BRIEF DESCRIPTION OF THE SEVERAL VIEWS OF THE DRAWINGS

FIG. 1 is an illustration of a block diagram of a code evaluation environment in accordance with an illustrative embodiment;

FIG. 2 is an illustration of a block diagram of features for segments of code in accordance with an illustrative embodiment;

FIG. 3 is an illustration of a portion of a policy in accordance with an illustrative embodiment;

FIG. 4 is an illustration of one implementation of a code evaluation environment in accordance with an illustrative embodiment;

FIG. 5 is an illustration of another implementation of a code evaluation environment in accordance with an illustrative embodiment;

DETAILED DESCRIPTION

Figure 6:
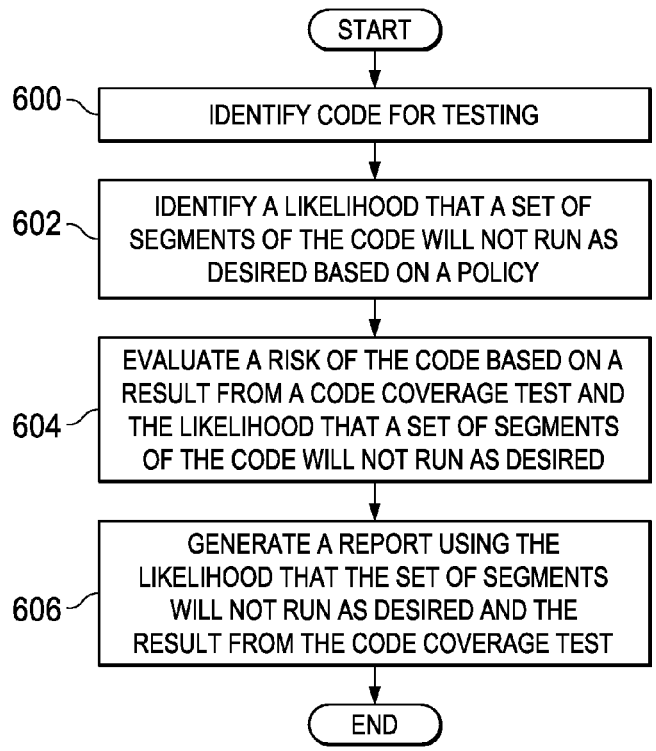
FIG. 6 is a flowchart of a process for evaluating code in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language, such as Java, Smalltalk, C++, or the like, and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which run on the computer or other programmable apparatus provide processes for implementing the functions/acts specified in the flowchart and/or block diagram block or blocks.

The different illustrative embodiments recognize and take into account a number of different considerations. For example, the different illustrative embodiments recognize and take into account that the amount of code that has actually been run during testing only provides an identification of what portions of the code have been run and what portions of the code have not been run during the tests. The different illustrative embodiments recognize and take into account that test coverage is measured as a percentage of the total code that has been run during the test. The different illustrative embodiments recognize and take into account that these currently-used tools do not convey or identify the importance of the code that has been tested or not tested in terms of how those portions of code will perform.

Thus, the different illustrative embodiments provide a method and apparatus for evaluating code. In one illustrative embodiment, a method identifies a likelihood that segments of the code will not run as desired based on the policy. The risk of the code is not performing as desired evaluated based on a result from a code coverage test and the likelihood that the segments of the code will not run as desired.

With reference now to the figures and, in particular, with reference to FIG. 1, an illustration of a block diagram of a code evaluation environment is depicted in accordance with an illustrative embodiment. In this depicted example, code 102 in code evaluation environment 100 is evaluated using computer system 104. Computer system 104 comprises set of computers 106. As used herein, "a set", when used with reference to items, means one or more items. For example, "set of computers 106" is one or more computers. When more than one computer is present in computer system 104, these computers may be in communication with each other using a network.

In this illustrative example, code evaluation tool 108 is software that runs on one or more computers in computer system 104. Code evaluation tool 108 identifies risk 110 for code 102. Risk 110 is for code 102 not performing as desired. Whether code 102 performs as desired may be measured in different ways. For example, code 102 does perform as desired if code 102 generates any error, an exception, a fatal error and/or some other error. As another example, code 102 does not perform as desired if code 102 has an endless loop. In still another example, code 102 does not perform as desired if code 102 is accesses a non-existent file, function, and/or other resource outside of code 102. Of course other metrics may be used to define whether code 102 performs as desired depending on the implementation.

Code 102 is comprised of plurality of segments 112. Code evaluation tool 108 identifies a likelihood that set of segments 114 will not run as desired based on policy 116. In these illustrative examples, set of segments 114 is one or more segments in plurality of segments 112 and may be, in some cases, all of plurality of segments 112. In these illustrative examples, a segment within plurality of segments 112 may be, for example, a line of code 102, a loop, a function, a module, or some other suitable grouping of code 102.

Policy 116 is a set of rules used to identify a likelihood that a particular segment will not run as desired. Policy 116 also may include data used to apply this set of rules to set of segments 114.

Code evaluation tool 108 evaluates risk 110 for code 102 based on result 118 from code coverage test 120 and likelihood 122 that set of segments 114 will not run as desired. In the illustrative examples, likelihood 122 may take various forms. For example, likelihood 122 may be risk values 124. For example, risk value 126 may be assigned to segment 128 in set of segments 114.

As another example, risk value 126 may be assigned to a segment or each segment associated with segment 128. For example, a second segment may be associated with segment 128. The second segment may be called by segment 128, or the second segment may be within the same loop or block as segment 128. This second segment may be considered to be associated with segment 128 and also may be assigned a risk value. This type of assignment may be used in addition to assigning risk value 126 to segment 128 or, in some cases, in place of assigning risk value 126 to segment 128. In these illustrative examples, a higher value for risk value 126 indicates that the risk of the code may increase.

This assignment of risk value 126 is made by code evaluation tool 108 and other segments related to that segment using policy 116. The assignment is based on at least one of whether segment 128 is run during code coverage test 120 and feature 130 for segment 128 as defined by policy 116. In these illustrative examples, risk 110 provides an identification of risk that is not based on the amount or portion of code 102 that is run during code coverage test 120. Instead, risk 110 identifies a risk for code 102 that particular segments in plurality of segments 112 of code 102 will not run as desired. Risk 110 may be based on particular risk values assigned to the particular segments of code. Risk 110 also may be based on the particular risk values for segments that are run, segments that are not run, or a combination of the two.

In the illustrative examples, code evaluation tool 108 may identify risk 110 after result 118 is generated from code coverage test 120. In other illustrative examples, code evaluation tool 108 may identify risk 110 while code coverage test 120 is run and as different parts of result 118 are generated. These two types of illustrative implementations are described in more detail below with respect to FIGS. 4 and 5.

With this information, code coverage test 120 may be updated to include segments in plurality of segments 112 that may not have been tested. In this manner, code coverage test 120 may be improved in addition to identifying risk 110 for code 102.

The illustration of code evaluation environment 100 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, code evaluation tool 108 may identify a risk for additional codes in addition to code 102 at the same time or in a queue. In still other illustrative examples, other testing in addition to code coverage test 120 may be run at the same time as code coverage test 120. For example, performance metrics may be collected during testing of code 102.

With reference now to FIG. 2, an illustration of a block diagram of features for segments of code is depicted in accordance with an illustrative embodiment. In this illustrative example, features 200 are examples of features that may be used to identify risk values for segments of code.

As depicted, features 200 includes error handling constructs 202, access and usage specifiers 204, system state notifications 206, programmer annotations 208, code complexity 210, and custom features 212. Of course, other features in addition to and/or in place of the ones illustrated here also may be used.

Error handling constructs 202 are features that involve the manner in which errors and/or exceptions are handled. For example, in Java programming language, the exception handling system and the class hierarchy may be used to identify possible errors. Statements like "throw," "throws," and "try/catch" may be identified using simple regular expressions. The statements may be assigned risk values for their occurrence and the block or location in which these statements occur. By assigning a risk value for every match found for this statement, code evaluation tool 108 may use policy 116 in FIG. 1 to indicate the risk for a statement and the risk that is added to the block in which the statement is found.

In one example, policy 116 in FIG. 1 may be used to identify various failures that may occur to give a picture of the different test cases that may be needed to ensure coverage or running of this code. For example, these types of statements in a catch block may be provided higher risk value than other lines of code. A failure to test this type of code, depending on its risk value inside a catch block, may be identified by policy 116 as being more severe than a failure to test the same number of statements that do not have a risk value or have a lower risk value.

In this illustrative example, a catch block is an exception handler. A catch block has a group of statements that are run if an exception is thrown in a block defined by a preceding "try" keyword. Catch blocks may be used in programming languages such as Java language.

Access and usage specifiers 204 are features that help identify the impact of failures in processing of segments of code that have these features. For example, these features may be used by policy 116 to identify the impact on other segments that use the segments that have these features. For example, these features may include public access methods or application programming interfaces that tend to be used extensively by external systems. In other words, methods or application programming interfaces that may be called by clients may have a higher impact when these types of segments fail. Method call and class usage hierarchies may aid in understanding the extent to which these are used in the code that is being tested.

System state notifications 206 are features in which messages may be generated based on running a particular segment. For example, the fact that a message may be generated or logged may indicate that user or programmer attention is needed for that particular segment. Additionally, the types of notifications may be used by policy 116 to identify a risk value to ascertain a risk for the segment in which this feature is found.

For example, messages may be traced, warning, error, and other suitable types of messages. A trace message may be given a lower risk value by policy 116 as compared to a warning or error message. Further, policy 116 may be used to assign risk values to other segments related to this segment. For example, the segment may be one within the same block as the segment that generates the message.

Programmer annotations 208 are types of features for which risk values may be assigned. The presence of code comments and other types of annotations may provide an indication to the complexity and importance of a particular segment of code. The amount or words used in the annotations may be used by policy 116 to generate a risk value for a particular segment.

Code complexity 210 is another feature that may be used by policy 116 to identify risk values for a segment of code. As the segment becomes more complex, a higher weight may be introduced. For example, if the segment in the code is a set of nested loops, the levels of nesting increase as additional lines of conditional blocks or iterations occur. These increases in the levels of nesting may result in a higher risk value being assigned to that segment as compared to segments with a lower level of nesting.

Custom features 212 are features that may be selected for a specific scenario or application that may need to be considered. Custom features 212 may be selectively used, depending of the type of code, the application of the code, or other suitable factors. In other words, custom features 212 may not be used every time.

Custom features 212 may include, for example, without limitation, a rule identifying a particular file written to by the code that is considered an undesired risk, a network operation sending data to another computer which may fail, and other suitable types of features. An example of a file to which data is written that may have an undesirable risk is if the code writes data to a system file for Windows. This file is considered a file with an undesired risk, because the file may not exist, may be write protected, or may have some other state that may cause the writing of information to that file to fail.

In the illustrative examples, the different features in features 200 are only examples of some features that may be used to identify risk values by policy 116. Other features may be used in addition to and/or in place of the ones illustrated.

Further, in these examples, the different features have been described as being used by policy 116 to assign a risk value to segments containing the features. Risk values also may be assigned by policy 116 to other segments associated with the particular segment in which the feature is found. This assignment of risk values may be used in addition to and/or in place of assigning risk values to the particular segment in which the feature is found.

With reference now to FIG. 3, an illustration of a portion of a policy is depicted in accordance with an illustrative embodiment. In this illustrative example, rule 300 is an example of a rule that may be within policy 116 in FIG. 1. In this example, rule 300 is applied to segments in the form of statements or lines of code.

Line 302 is the name of the rule in policy 116. Line 304 is an opening brace, and line 306 is a closing brace for rule 300. Line 308 is the condition that determines whether a risk value is assigned to a statement. Line 308 may also be referred to as a catch line which identifies the statement. If a statement matches line 308, then a risk value may be assigned to that particular segment. Line 310 provides a risk value for the rule for the particular statement that matches rule 300. Line 312 provides a risk value for statements that are enclosed within the same block as the particular statement. Line 314 provides a risk value for statements that may be located before or after a block that is enclosed by braces.

Rule 300 is an illustrative example of only one form in which a rule may be implemented in policy 116 and identifies catch statements in the code, since catch statements identify points in code where exceptions are being handled. Other rules may be present that are applied to other types of segments, such as loops, functions, and other suitable types of segments. For example, another example for a rule may identify a "throw" statement in the code. The throw statement indicates that an anomaly has occurred and an exception needs to be generated. In yet another illustrative example, the rule may identify a system file being accessed in the code. Access to a system file indicates risk, because the file may not be accessible.

With reference now to FIG. 4, an illustration of one implementation of a code evaluation environment is depicted in accordance with an illustrative embodiment. In FIG. 4, an illustration of one implementation for code evaluation environment 100 in FIG. 1 is depicted.

In this illustrative example, code parser 400, source code instrumenter 402, and report generation engine 404 are examples of components in code evaluation tool 108 in FIG. 1. In this illustrative example, code parser 400 identifies code 406 for processing. In this example, code 406 is source code. Code parser 400 parses code 406 to form parsed code 407 and allows source code instrumenter 402 to identify segments of code 406. In these illustrative examples, code parser 400 converts code into format that can be used by source code instrumenter 402. In other words, code parser 400 may process code 406 to form parsed code 407, which has a format used by source code instrumenter 402. Additionally, code parser 400 also may identify segments in code 406 that are of interest for code coverage testing.

Source code instrumenter 402 receives parsed code 407 from code parser 400. Source code instrumenter 402 adds additional code configured to generate information about the running of code 406. The additional code may include statements for generating messages to identify which lines of code 406 are run during running of code 406.

In these illustrative examples, source code instrumenter 402 uses policy 408 to generate instrumentation code for different features that may be present in code 406. In particular, source code instrumenter 402 includes statements with indications of risk values that are assigned to particular segments of code when those segments of code are run. Further, source code instrumenter 402 also may implement instrumentation code based on instrumentation criteria 410.

Instrumentation criteria 410 may be other criteria that source code instrumenter 402 generates statements for based on the testing desired for code 406. For example, instrumentation criteria 410 may include generating statements to identify the performance of various segments within code 406.

The result of this process by source code instrumenter 402 is instrumented source code 411. Instrumented source code 411 may then be run in runtime environment 412 by code coverage tool 414. Code coverage tool 414 runs instrumented source code 411 using test cases 416. Code coverage tool 414 may be implemented using any available code coverage tool for performing coverage tests.

Test cases 416 are different inputs used to run instrumented source code 411. Test cases 416 may be designed to run as much of instrumented source code 411 as possible. Additionally, test cases 416 may include inputs to test the performance of instrumentation criteria 410 as well as identifying messages that may require debugging or other operations.

Results 418 are generated from running instrumented source code 411 by code coverage tool 414. Results 418 may be, for example, without limitation, event logs and other information generated by code coverage tool 414 running test cases 416 in runtime environment 412.

Report generation engine 404 generates report 420 using results 418 and policy 408. In these illustrative examples, report 420 identifies a coverage of code 406 and a risk for code 406. The coverage is information typically generated by code coverage tool 414. The risk is generated from instrumented source code 411 generated by source code instrumenter 402 using policy 408. In these illustrative examples, report 420 may include an identification of an overall risk for code 406. Additionally, report 420 also may identify risks for different segments within code 406. In this manner, changes, improvements, or other evaluations of code 406 may be made.

With this information, the effectiveness of the test run using code coverage tool 414 with test cases 416 may be identified. In some cases, improvements to test cases 416 may be made. These improvements may include modifying test cases 416, adding new test cases to test cases 416, or a combination of the two. These improvements are made based on report 420. In this manner, different segments within code 406 that are identified as being important to test cases 416 may be tested through the modification or generation of new test cases for test cases 416. As another example, an order in which code coverage tests in a group of code coverage tests should be run may be selected based on the likelihood that a set of particular segments in the set of segments of the code will not run as desired based on the policy.

With reference now to FIG. 5, an illustration of another implementation of a code evaluation environment is depicted in accordance with an illustrative embodiment. In this illustrative example, another example of an implementation for code evaluation environment 100 in FIG. 1 is depicted. In this illustrative example, the identification of a likelihood that a set of segments in the code will not run as desired and the evaluation of the risk of the code is performed after the coverage of the code has been identified.

As depicted, code coverage tool 500 runs code 502 using test cases 503. Code 502 is source code in this example. Code coverage tool 500 also may be implemented using any currently-available code coverage tools. With this example, code coverage tool 500 generates result 504. Result 504 may include not covered code 506 and covered code 508. Not covered code 506 is code that was not run during the code coverage test run by code coverage tool 500. Covered code 508 is code that was run during the code coverage test of code 502.

Code evaluation tool 510 uses information in result 504 to generate report 512. In these illustrative examples, code evaluation tool 510 is an example of code evaluation tool 108 in FIG. 1.

More specifically, code evaluation tool 510 uses result 504 and policy 514 to generate report 512 in these examples. Code evaluation tool 510 may parse result 504 to identify segments of code that have been run and segments of code that have not been run during the code coverage test run by code coverage tool 500. Based on these segments, code evaluation tool 510 identifies a likelihood that a particular set of segments in code 502 will not run as desired based on policy 514. This likelihood is identified as a risk in these illustrative examples.

With report 512, a risk for code 502 may be identified. Further, changes to test cases 503 also may be made to improve testing of code 502 or other types of code.

The illustration of the code evaluation environment in FIGS. 4 and 5 are only meant as illustrations of example implementations for code evaluation environment 100 in FIG. 1. These two examples illustrate how the identification of risk values may be performed while the code is run or after the code has been run. Further, in some illustrative examples, the code coverage test may be included as processes within the code evaluation tool rather than as a separate program as illustrated in FIGS. 4 and 5.

With reference now to FIG. 6, a flowchart of a process for evaluating code is depicted in accordance with an illustrative embodiment. The process illustrated in FIG. 6 may be implemented in code evaluation environment 100 in FIG. 1. In these illustrative examples, these different steps may be implemented as program code for code evaluation tool 108 in FIG. 1.

The process begins by identifying code for testing (step 600). This identification may be made by a user input selecting a file containing the code, the selection of the file from a browser, or some other suitable type of user input. In still other illustrative examples, the code may be identified from testing based on an identification of the code in a file identifying the code. This file also may identify other code for testing in these illustrative examples.

The process then identifies a likelihood that a set of segments of the code will not run as desired based on a policy (step 602). The process then evaluates a risk of the code based on a result from a code coverage test and the likelihood that a set of segments of the code will not run as desired (step 604). In these illustrative examples, this risk may be identified during running code or after the code has been run, depending on the particular implementation.

The process then generates a report using the likelihood that the set of segments will not run as desired and the result from the code coverage test (step 606), with the process terminating thereafter.

With the report, a risk for the code may be identified. With this risk, changes to the code may be made to reduce the risk. Further, if the code coverage does not cover areas that have been identified as having high risks, the test cases may be changed to provide coverage in the desired areas that have a higher level of risk. These changes may include modifying test cases, adding new test cases, or some combination of the two.

Figure 7:
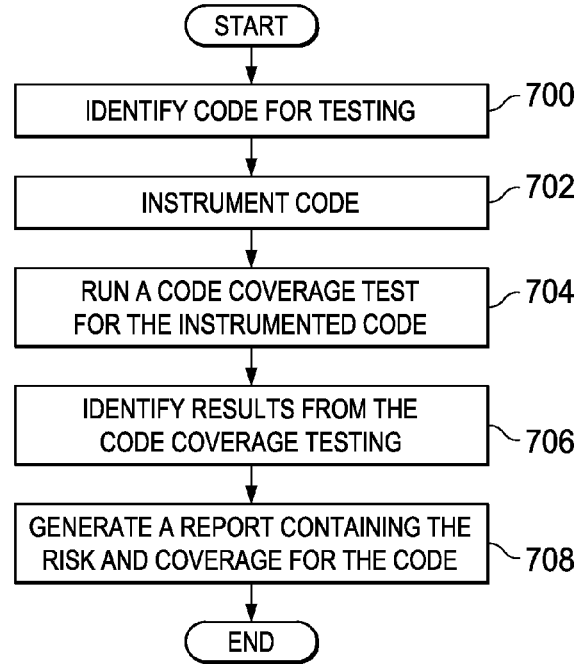
FIG. 7 is a flowchart of a process for evaluating code in accordance with an illustrative embodiment.

With reference now to FIG. 7, a flowchart of a process for evaluating code is depicted in accordance with an illustrative embodiment. The process illustrated in FIG. 7 may be implemented using the code evaluation environment depicted in FIG. 4.

The process begins by identifying code for testing (step 700). Thereafter, the code is instrumented (step 702). In this step, code, such as statements, may be added to generate information during code coverage testing. These statements may include risk values, such as those identified using policy 116 in FIG. 1. A particular example may be values, such as those shown for rule 300 in FIG. 3.

The process runs a code coverage test for the instrumented code (step 704). This test may include running different test cases on the instrumented code. The process then identifies results from the code coverage testing (step 706). These results include an identification of the different lines of code that have been run during the code coverage testing. Additionally, this information includes risk values that were inserted in statements during instrumentation of the code. The process then generates a report containing the risk and coverage for the code (step 708), with the process terminating thereafter.

Figure 8:
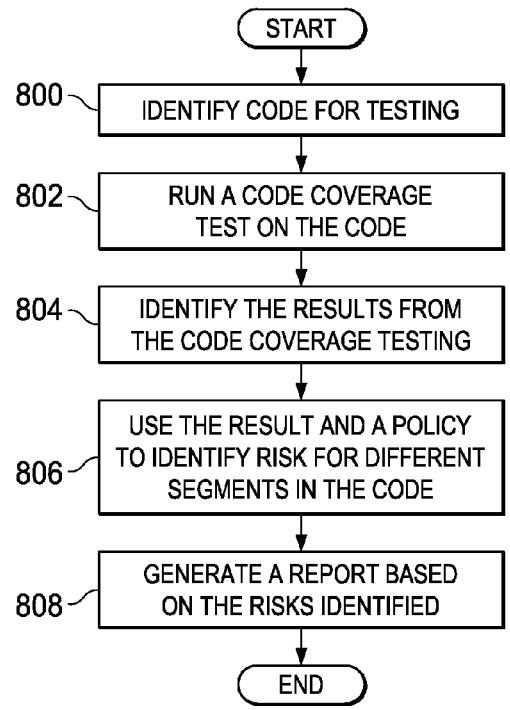
FIG. 8 is a flowchart of a process for evaluating code in accordance with an illustrative embodiment.

With reference now to FIG. 8, a flowchart of a process for evaluating code is depicted in accordance with an illustrative embodiment. The process illustrated in FIG. 8 may be implemented using the code evaluation environment depicted in FIG. 5.

In this illustrative example, the process begins by identifying code for testing (step 800). Thereafter, the process runs a code coverage test on the code (step 802). This code coverage testing is the normal testing performed using code coverage testing tools. The code may be instrumented as part of this process, but statements are not added using the policy for evaluating risks in this particular example to generate the instrumented code.

The process identifies the results from the code coverage testing (step 804). The process then uses the result and a policy to identify risk for different segments in the code (step 806). The process generates a report based on the risks identified (step 808), with the process terminating thereafter. Additionally, the report also may include the results from the code coverage test identifying portions of the code that have been covered or uncovered.

Figure 9:
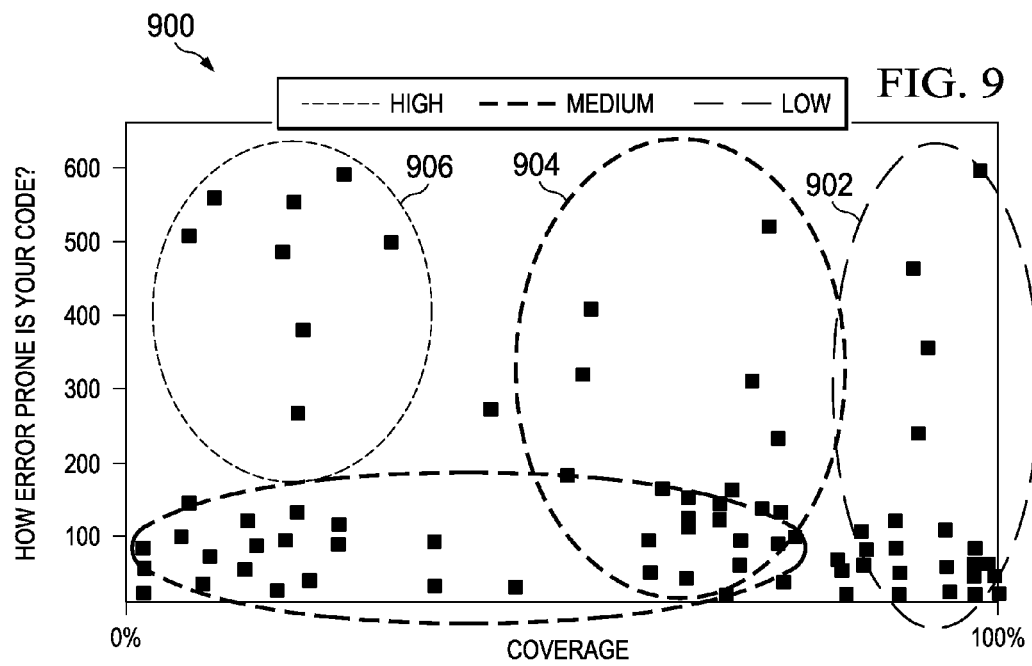
FIG. 9 is illustration of a report in accordance with an illustrative embodiment.

With reference now to FIG. 9, an illustration of a report is depicted in accordance with an illustrative embodiment. In this illustrative example, report 900 is shown in a graphical form and is an example of one manner in which report 420 in FIG. 4 and report 512 in FIG. 5 may be implemented.

In this illustrative example, report 900 shows a percent coverage on the X axis and a risk of error for the code on the Y axis. The different data points represent codes that have been tested. The code in section 902 has a low risk in these examples. Although some of the code may have a high risk value for a likelihood that the segments may not perform as desired, the coverage or amount of code that has been run during the testing is high and indicates that those particular segments were run during the testing.

In these illustrative examples, the code in sections 904 and 906 has a medium level of risk relative to the other code. The code in section 906 is considered to have the highest level of risk as compared to the code in the other sections. The code in this section does not have a high level of coverage and has a high risk. In other words, the code in section 906 may include segments that have a high likelihood of not performing or running as desired, and the code coverage test did not run these segments during testing of the code.

Report 900 is only one example of a report that may be generated. Other reports may take other forms. For example, other reports may only include text and risk values. Yet other reports may use bar graphs, pie charts, or other suitable graphic illustrations. As yet another example, other reports may only identify the risk of the code and not coverage.

Figure 10:
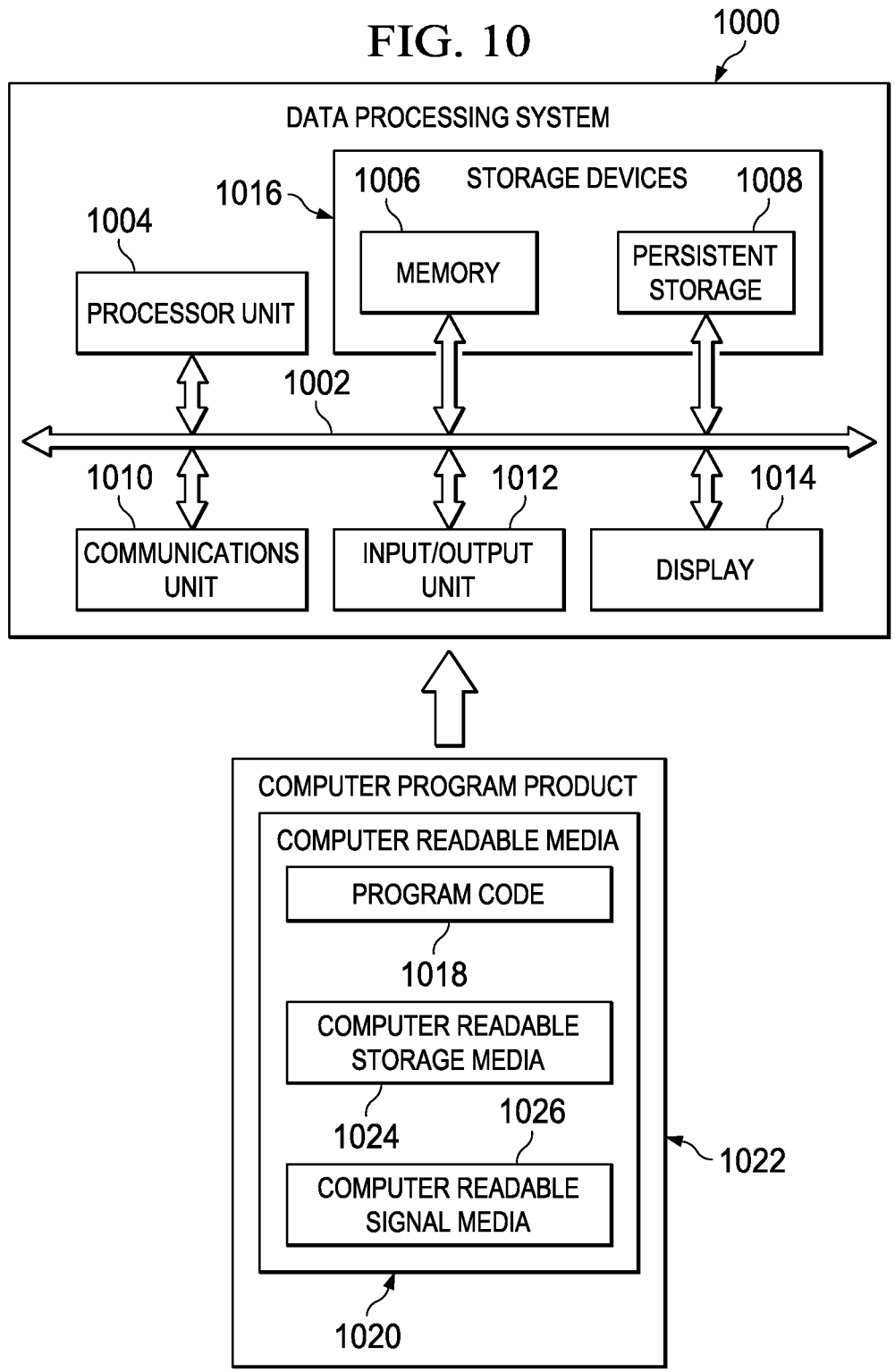
FIG. 10 is an illustration of a data processing system in accordance with an illustrative embodiment.

Turning now to FIG. 10, an illustration of a data processing system is depicted in accordance with an illustrative embodiment. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to process instructions for software that may be loaded into memory 1006. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for processing by processor unit 1004. The processes of the different embodiments may be performed by processor unit 1004 using computer-implemented instructions, which may be located in a memory, such as memory 1006.

These instructions are referred to as program code, computer usable program code, or computer readable program code that may be read and processed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for processing by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008.

Computer readable storage media 1024 also may take the form of a persistent storage, such as a hard drive, a thumb drive, or a flash memory, that is connected to data processing system 1000. In some instances, computer readable storage media 1024 may not be removable from data processing system 1000. In these examples, computer readable storage media 1024 is a physical or tangible storage device used to store program code 1018, rather than a medium that propagates or transmits program code 1018. Computer readable storage media 1024 is also referred to as a computer readable tangible storage device or a computer readable physical storage device. In other words, computer readable storage media 1024 is a media that can be touched by a person.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018. The program code stored on a computer readable storage medium for data processing system 1000 may be downloaded over a network to a remote data processing system for use in a second computer readable storage medium in the remote data processing system.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be configured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1006, or a cache, such as found in an interface and memory controller hub that may be present in communications fabric 1002.

Thus, the different illustrative examples provide a method and apparatus for evaluating code. A likelihood that a set of segments in the code will not run as desired are identified based on a policy. The risk of the code is evaluated based on a result from a code coverage test and the likelihood that these segments of code will not run as desired.

In the different illustrative examples, the results from the evaluation of the risk may be used to determine more quantitatively the risk of the code rather than just using the amount of code run. For example, the different illustrative embodiments allow for an identification of whether segments of code that have some level of risk have been run during the code coverage test. If those segments have not been run, then the use of the code may be riskier than if the segments had been run and tested.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

What is claimed is:

1. A method for evaluating code, the method comprising:
identifying a set of segments of the code that will not run as desired based on a policy;
evaluating a risk of the code not performing as desired based on a result from a code coverage test and the set of segments of the code that will not run as desired; and instrumenting the code to identify a segment of code as the segment of code that is run during the code coverage test, and wherein the evaluating step comprises:

assigning a risk value to the segment of code when the segment of code is identified as being run during the code coverage test, wherein an identification of the segment of code as being run is a portion of a result;

assigning a value to each of a set of related segments that is related to the segment of code when the segment of code is identified as being run during the code coverage test; and identifying the risk of the code not performing as desired using values generated while running the code coverage test.

2. The method of claim 1 further comprising:
running the code coverage test to generate the result, wherein the result identifies portions of the code run during the code coverage test.

3. The method of claim 1, wherein identifying the set of segments of the code that will not run as desired based on the policy comprises:
assigning the risk value to a segment in the set of segments based on at least one of whether the segment is run during the code coverage test and a feature for the segment as defined by the policy.

4. The method of claim 1 further comprising:
running the code coverage test to generate the result with a coverage of the code prior to evaluating the risk of the code not performing as desired based on the result from the code coverage test and the segments of the code that will not run as desired.

5. The method of claim 1 further comprising:
selecting an order to run code coverage tests in a group of code coverage tests based on a set of particular segments in the set of segments of the code that will not run as desired based on the policy.

6. The method of claim 2 further comprising:
generating the code coverage test based on a set of particular segments in the set of segments of the code that will not run as desired based on the policy.

7. The method of claim 1, wherein the policy identifies a feature for a segment and a set of rules to assign a risk value to a group of segments in the code based on an event involving the segment based on the feature.

8. The method of claim 1, wherein a segment is selected from one of a line of the code, a loop, a function, and a module.

9. A computer comprising:
a bus;
a storage device connected to the bus, wherein program code is stored on the storage device; and
a processor unit connected to the bus, wherein the processor unit is configured to run the program code to identify a set of segments of code that will not run as desired based on a policy; evaluate a risk of the code not performing as desired based on a result from a code coverage test and the set of segments of the code that will not run as desired; and instrument the code to identify a segment of code as the segment of code is run during the code coverage test and wherein in being configured to evaluate the risk of the code not performing as desired based on the result from the code coverage test and the set of segments of the code that will not run as desired, the processor unit is further configured to assign a risk value to the segment of code when the segment of code is identified as being run during the code coverage test in which an identification of the segment of code as being run is a portion of a result and assign the risk value to each of a set of related segments that is related to the segment of code when the segment of code is identified as being run during the code coverage test; and identify the risk using risk values generated while running the code coverage test.

10. The computer of claim 9, wherein the processor unit is further configured to run the code coverage test to generate the result, wherein the result identifies portions of the code run during the code coverage test.

11. The computer of claim 9, wherein in being configured to identify the set of segments of the code that will not run as desired based on the policy, the processor unit is further configured to assign the risk value to a segment in the set of segments based on at least one of whether the segment is run during the code coverage test and a feature for the segment as defined by the policy.

12. The computer of claim 9, wherein the processor unit is further configured to run the code coverage test to generate the result with a coverage of the code prior to evaluating the risk of the code not performing as desired based on the result from the code coverage test and the segments of the code that will not run as desired.

13. A computer program product comprising:
a computer readable storage device;
first program code for identifying a set of segments of code that will not run as desired based on a policy;
second program code for evaluating a risk of the code not performing as desired based on a result from a code coverage test and the set of segments of the code that will not run as desired; and
third program code for instrumenting the code to identify a segment of code as the segment of code that is run during the code coverage test, and wherein the second program code comprises program code for assigning a risk value to the segment of code when the segment of code is identified as being run during the code coverage test, wherein an identification of the segment of code as being run is a portion of a result, assigning a value to each of a set of related segments that is related to the segment of code when the segment of code is identified as being run during the code coverage test, and identifying the risk of the code not performing as desired using values generated while running the code coverage test, wherein the first program code and the second program code and the third program code are stored on the computer readable storage device.

14. The computer program product of claim 13, wherein the computer readable storage device is in a data processing system, and the first program code and the second program code and the third program code are downloaded over a network from a remote data processing system to the computer readable storage device in the data processing system.

15. The computer program product of claim 14, wherein the computer readable storage device is a first computer readable storage device, wherein the first computer readable storage device is in a server data processing system, and wherein the first program code and the second program code and the third program code is downloaded over a network to a remote data processing system for use in a second computer readable storage device in the remote data processing system.

* * * * *